Patented Nov. 29, 1932

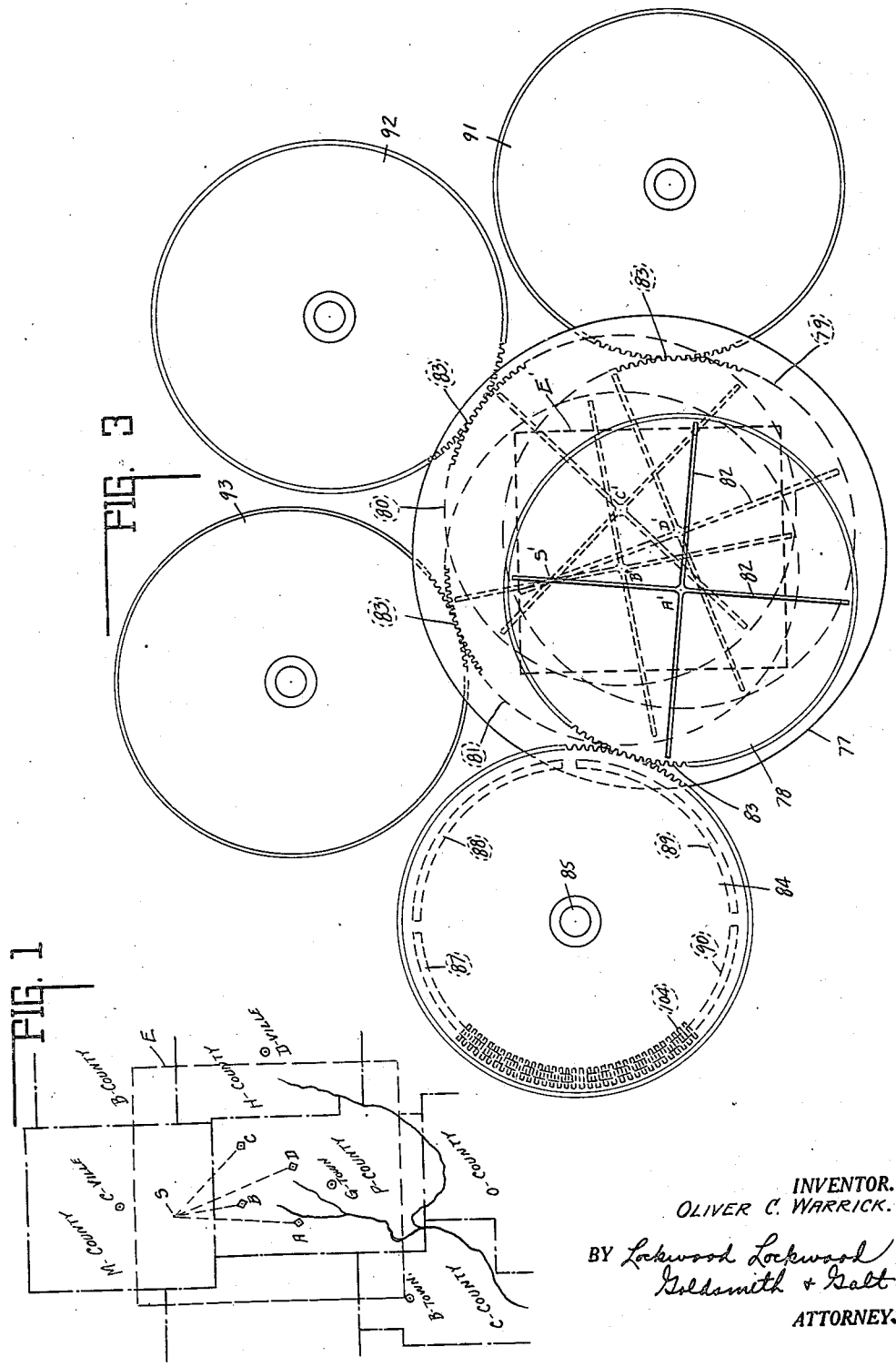

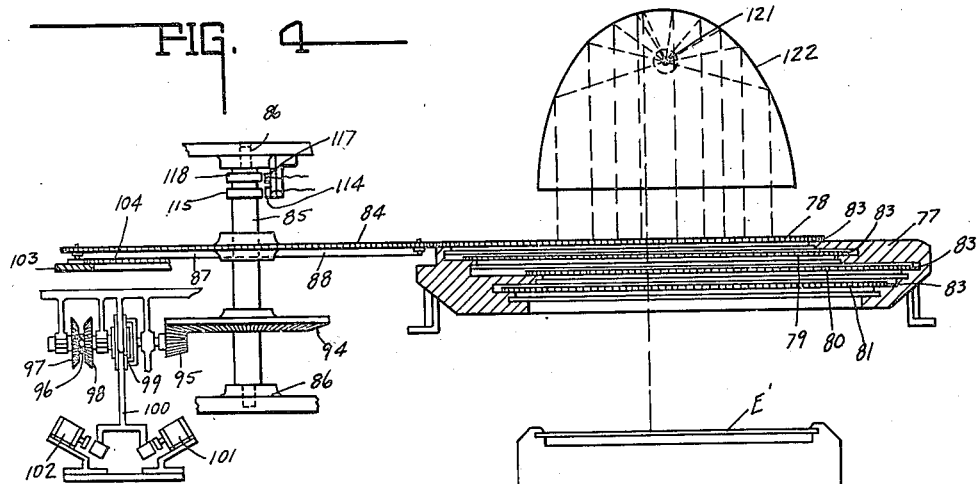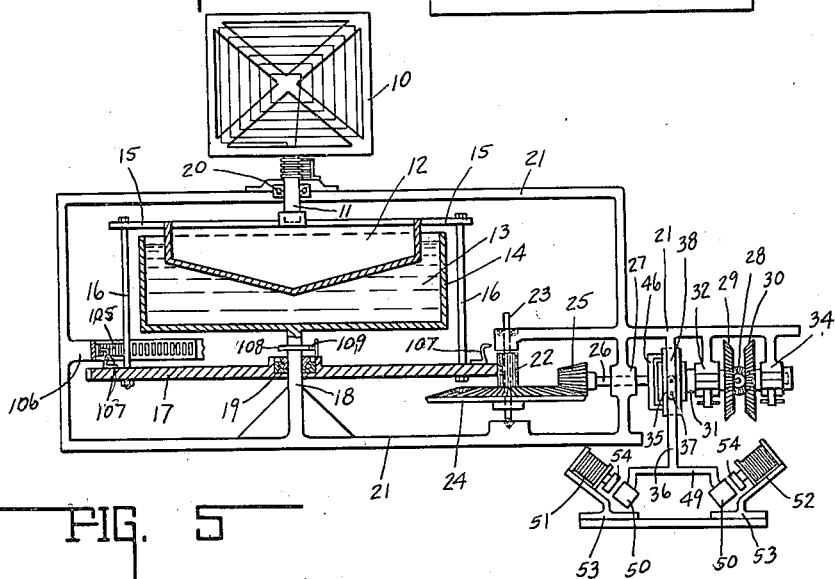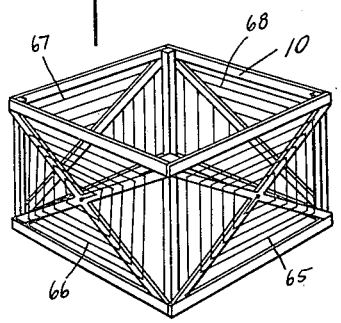

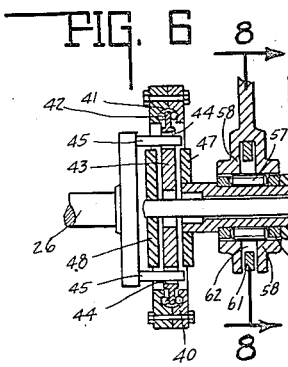

1,889,026

UNITED STATES PATENT OFFICE

OLIVER C. WARRICK, OF INDIANAPOLIS, INDIANA

APPARATUS FOR ASSISTING AIR AND SEA NAVIGATION

Application filed June 13, 1930. Serial No. 460,845.

This invention relates to apparatus adapted to assist in navigation by sea and air.

The principal object of the invention is to provide apparatus by means of which radio signals sent out by airplane or ship may be picked up by a plurality of receiving stations which are caused thereby to automatically indicate the position of said ship or airplane.

Another object of the invention is to provide means combined with the foregoing whereby the pilot of the ship or air plane may be constantly informed of his position.

Another object of the invention is to provide means whereby a permanent record is made of the position and path of the ship or air plane so long as signals are received therefrom.

The principal feature of the invention resides in the use of a plurality of directional receiving stations, each having apparatus automatically operable in response to incoming radio signals to indicate the direction from which said signals are received, together with apparatus for combining said indications at a central point to form an indication of the exact position of the source of said signals.

Another feature of the invention resides in the provision of means for projecting said indication upon a photographic plate whereby a permanent record of the position and path of said signal source is preserved.

Another feature of the invention resides in the use of a radio-television receiver adapted to receive and transmit an image of the said indication to a radio-television receiver carried by the ship or airplane or other means of travel from which said signals are received.

Other features of the invention reside in the novel form of apparatus used in the various parts of the invention.

Other features and objects of the invention will be understood from the accompanying drawings and the following description and claims:

Fig. 1 is a map of a portion of country showing a desirable manner in which a plurality of radio receiving stations are distributed to aid an airplane to find a landing field in weather of low visibility. Fig. 2 is an elevational view partly in section of the receiving apparatus for each of said stations illustrating the mechanism used for adjusting said apparatus to indicate the direction of incoming signals. Fig. 3 is a plan view of certain parts of the apparatus used at the central point to produce the desired indication of the position of the source of signals. Fig. 4 is an elevational view of the apparatus of Fig. 3 with parts removed to show other parts in detail. Fig. 5 is a perspective view of a preferred form of radio antenna for the receiving stations. Fig. 6 is a sectional view of a clutch mechanism used in the actuation of the mechanism of Figs. 2 and 4. Fig. 7 is an elevational view of a portion of said clutch mechanism. Fig. 8 is a sectional view taken on the line 8—8 of Fig. 6 and showing the internal construction of an adjustable bearing used with the said clutch mechanism. Fig. 9 is a perspective view of a roller-retaining member for use with said bearing. Fig. 10 is a diagram of the electrical wiring for adjusting the receiving apparatus of each receiving station to indicate the direction of incoming signals. Fig. 11 is an electrical wiring diagram for the apparatus used in transmitting said indication to the central station. Fig. 12 is a view in elevational of a portion of the instrument board of an airplane having mounted thereon the apparatus required for receiving the indication of position by television.

In the map shown in Fig. 1, four radio receiving stations A, B, C and D are shown positioned in a desirable manner for the performance of the invention. Herein the stations are shown on the four corners of a rhombus. However, this arrangement is not necessary, the only limitation being that no one of the stations shall be at the apex of a right angle with respect to any two of the others. In Fig. 1 the dotted line E indicates approximately the extent of territory which may be conveniently covered by this group of stations. The territory which may be covered by any group of stations is limited only by the receiving range of the stations and the distance at which they are spaced from each other.

Each of the stations A, B, C and D is preferably provided with a four-sided antenna support 10. The said support is carried upon a vertical stem 11 in turn supported upon a float 12 carried upon liquid 13 in a liquid reservoir 14. The float 12 also carries outwardly-extending arms 15 from which are supported downwardly-extending members 16 in turn carrying a gear member 17. The reservoir 14 is supported by a cylindrical support member 18 passing through the center of the gear 17 and coaxial with the stem 11. A ball bearing 19 is interposed between the gear 17 and the support member 18. A similar ball bearing 20 engages the stem 11 and is carried by a frame member 21. By this construction, the weight of the antenna support 10 is carried upon the float 12 while the bearings 19 and 20 permit rotation thereof about a substantially vertical axis with the minimum frictional resistance.

A pinion 22 carried by a vertical stem 23 engages the gear 17. The stem 23 is supported upon portions of the frame 21 and also carries a bevel gear 24. The bevel gear 24 engages a pinion 25 carried upon a horizontal shaft 26 in turn supported upon a bearing 27 formed in a portion of the frame 21. A suitable source of power, such as an electric motor, not shown, drives a bevel pinion 28. The pinion 28 engages a pair of bevel gears 29 and 30. The gear 29 is carried upon a sleeve 31 supported in a bearing 32 upon a portion of the frame member 21. The gear 30 is carried upon a stem 33 passing through the sleeve 31 and supported at its outer end by a bearing 34 carried upon the frame 21. By this means the rotation of the pinion 28 causes rotation of the sleeve 31 in one direction and of the stem 33 in the opposite direction. A clutch member 35, the internal construction of which will be hereinafter described in detail, is adapted to selectively connect the stem 26 with either the sleeve 31 or the stem 33 for rotation in either direction. By this means the antenna support 10 may be rotated in either direction, dependent upon the actuation of the clutch 35.

The clutch 35 is actuated by means of a yoke member 36 pivotally supported by pivot screws 37 upon a downwardly-extending portion 38 of the frame 21. Above the pivot screws 37 a second pair of pivot screws 39 are carried by the yoke 36 and engage a substantially circular ball-retaining member 40 formed with a ball race 41 therein. Ball bearings 42 are carried within the ball race 41 and engage the outer edge of a disc member 43. The disc member 43 is provided with a pair of holes 44 through which project a pair of pins 45 carried by a member 46 in turn carried by the stem 26. The sleeve 31 carries a disc 47 normally spaced a short distance from one side of the disc 43 and the stem 33 extends through the disc 43 and carries a disc 48 normally spaced from the opposite side of the disc 43. By this means a movement of the yoke member 36 to the left in Fig. 2 moves the retaining member 40 to the right, bringing the disc 43 carried thereby into frictional engagement with the disc 47. The said disc is, therefore, rotated in the direction of the disc 47 and the said rotation is imparted to the stem 26 and to the antenna support 10. When the yoke member 36 is moved to the right in Fig. 2, the disc 43 engages the disc 48 and rotation in the opposite direction is obtained.

The yoke member 36 carries at its lower end a cross bar 49 upon each end of which is carried an armature 50 of paramagnetic material. Adjacent one of the armatures 50 there is positioned an electromagnet 51. An electromagnet 52 is positioned adjacent the opposite armature 50. The said electromagnets are adjustably supported upon support members 53. A block of non-magnetic material 54 is interposed between the core of each of said magnets and its corresponding armature. The said armatures, magnets and non-magnetic blocks are adjusted in position so that only a slight gap is left between the armatures 50 and the non-magnetic blocks 54. This gap is just sufficient to allow the movement of the yoke member 36 to cause engagement of the discs 43, 47 and 48 as previously described.

For adjusting the space between the discs 43, 47 and 48, the bearings 32 and 34 are formed as indicated in Figs. 6 and 8. In the bearing 32 a split roller retainer 55 is provided, the outer ends of which are adapted to engage the hub or gear 29 and a shoulder 56 on the sleeve 31 respectively. Rollers 57 engage the outer surface of sleeve 31 and the inner surface of the bearing proper 58, and are held in position by the retainer 55. The roller retainer 55 is formed with radially-projecting portions 59 engaging suitable recesses in the bearing proper and carrying threads 60 in the edge thereof. The threads 60 are adapted to engage internal threads in a gear ring 61 carried in a slot 62 in the bearing proper. The threads 60 and the threads engaging therewith are so formed that rotation of the gear rim 61 causes axial movement of the retainer 55. For rotating the gear ring 61, a worm 62 is provided upon a vertical stem 64 externally operable. By rotation of the stem 64 the retainer 55 may be adjusted in either direction to adjust the gap between disc 43 and disc 47. A similar construction is provided for bearing 34 for adjusting the gap between disc 43 and disc 48. These adjustments are never sufficient in amount to disturb the engagement between gears 28, 29 and 30.

The antenna support 10 is preferably provided with antennæ 65, 66, 67 and 68 carried upon the four sides thereof. The antenna 65 is connected to antenna 67 by means of a wire 69 and the antennæ 66 and 68 are connected together by wire 70 (Fig. 10). Thus the antennæ 65 and 67 together form a single antenna adapted to provide maximum signal strength when signals are received from a direction at right angles to the faces of the antenna support upon which the said antennæ are mounted. Similarly, the antennæ 66 and 68 form a single antenna adapted to provide maximum signal strength when signals are received from a direction at right angles thereto. Antenna 65 is connected by a wire 71 with a radio receiver of any suitable form 72. Antenna 68 is connected by a wire 73 to a similar receiver 74. Amplified current produced by the receiver 72 is carried by wires 75 to magnet 52. Current produced by receiver 74 is carried by wires 76 to magnet 51.

By means of this apparatus, when signals are received by antennæ 65 and 67 with greater strength than are received by antennæ 66 and 68, the magnet 52 is energized to a greater degree than the magnet 51. The magnet 52, therefore, attracts its armature 50 to engage the clutch 55 for turning the antenna support in one direction. This rotation causes a change in the position of the antennæ whereby the signal strength received by antennæ 65 and 67 is reduced and that received by antennæ 66 and 68 is increased. The rotation continues until the relation of signal strength from the two antennæ is reversed. When this occurs, magnet 51 attracts its armature with a stronger force than magnet 52, swinging the clutch to the opposite direction. As the signal strength received by the two antennæ approaches equality, a series of extremely short movements alternating in direction is produced. This results in the antenna support 10 remaining in a substantially fixed position. If, when this occurs, the amplification obtained by receivers 72 and 74 are exactly equal, one corner of the antenna support 10 will point directly toward the source of signals, thereby indicating that the said signal source lies upon one of the diagonals of the said antenna support.

In order to insure that the amplification in the two receivers 72 and 74 is exactly equal, the device is checked by the receipt of signals from a known point. The amplification of the receivers is then adjusted until one corner of the antenna support points toward the known point. If signals are thereafter received from another point, the antenna support is automatically moved to indicate the direction of said signals. Each of the receiving stations A, B, C and D is similarly equipped so that when signals are simultaneously received by all four stations from a point, such as S in Fig. 1, the antenna supports of the four stations each assumes a position with one corner pointing toward the point S.

At a convenient central point apparatus is provided for receiving from each receiving station an indication of the direction of the signal source and combining the said indications to form an indication of the position of said source. The said apparatus includes a base member 77 upon which are rotatably mounted a plurality of discs 78, 79, 80 and 81. The said discs are arranged preferably in superposed position as illustrated in Fig. 4 and each rotates about a substantially vertical axis. The position of the axes of rotation of the various discs are chosen to correspond to scale to the position of the receiving stations A, B, C and D. Thus, the center of rotation A' of disc 78 corresponds in position to that of receiving station A. Similarly, the centers of rotation B', C' and D' of the other three discs correspond in position to those of the receiving stations B, C and D. Each disc has a pair of slotted openings 82 at right angles to each other and intersecting at the axis of rotation of the disc. The periphery of each of the discs is fitted with gear teeth 83. The teeth of disc 78 engage mating teeth upon a gear member 84 carried upon a vertical stem 85 suitably mounted in bearings 86 and carrying on the underside thereof four arcuate electrical contact members 87, 88, 89 and 90. The teeth of the disc 79 engage a similar gear member 91 similarly equipped and the teeth of discs 80 and 81 similarly engage similar gear members 92 and 93. The stem 85 is also fitted with a bevel gear 94 meshing with a bevel pinion 95. A bevel pinion 96 is continuously driven by any suitable power means and meshes with bevel gears 97 and 98 to drive the same in opposite directions. A clutch 99, similar in construction to the clutch 35, connects pinion 95 to gears 97 and 98. The clutch 99 is operated by a yoke lever 100 actuated by magnets 101 and 102 in the same manner as the clutch 35 is actuated by magnets 51 and 52. By this construction the gear 84 and disc 78 may be rotated in either direction, depending upon which of the magnets 101 and 102 is energized.

Beneath the gear member 84 there is mounted a suitably supported insulation member 103 carrying a plurality of electrical contact members 104 adapted to engage the contact members 87, 88, 89 and 90. The said contact members are insulated from each other and are arranged about a quarter circle. In the corresponding control station a plurality of similar contact members 105 are carried upon a support 106 in turn carried by the frame 21. The gear member 17 carries four contact members 107 adapted to engage the contact members 105. The members 107 are electrically connected together and are positioned upon the gear member 17 at 90-degree intervals. A slip ring 108 is carried on the support member 18 and is engaged by a brush 109 electrically connected to the contact members 107. The slip ring 108 is connected by a wire 110 with a generator 111 or other suitable source of electrical current which is in turn connected by wires 112 with one terminal of each of the magnets 101 and 102. The opposite terminal of the magnet 101 is connected by a wire 103 with a brush 114 engaging a slip ring 115 carried by the stem 85. The slip ring 115 is electrically connected to the arcuate contact members 87 and 89. The opposite terminal of the magnet 102 is connected by a wire 116 to a brush 117 engaging a slip ring 118 also carried by the stem 85. The slip ring 118 is electrically connected to the arcuate contact members 88 and 90. Each of the contact members 104 is connected to a corresponding contact member 105 by conductor 119 carried in a cable 120. A gap is provided between each pair of contact members 87, 88, 89 and 90 substantially equal in amount to the spacing of the contact members 104.

In the operation of this portion of the apparatus, one of the contact members 107 is always in engagement with one of the contact members 105. Assuming that the contact member 90 is in engagement with the contact member 104 corresponding to this particular contact member 105, a circuit is formed as follows: 111, 110, 108, 109, 107, 105, 119, 104, 90, 118, 117, 116, 102, 112, 111. The magnet 102 is thereby energized, causing rotation of the gear 84 in one direction. This rotation continues until the gap between contact member 90 and the next adjacent contact member comes opposite the particular contact member 104 which is energized. When this occurs, rotation of gear 84 ceases, since the circuit is broken. If the gear 84 overtravels, contact member 87 or 89 engages the energized contact member 104 setting up a similar circuit for energizing magnet 101 and causing rotation in the opposite direction. Thus the energizing of any one of the contact members 104 causes rotation of the gear 84 in one direction or the other until one of the gaps between contact members 87, 88, 89 and 90 comes opposite the energized contactor 104. By this means the angular positions of the gear 84 and the disc 78 are maintained in exact correspondence with the angular position of the gear 17 which in turn corresponds to the angular position of the antenna support 10. The accuracy with which corresponding positions are maintained depends upon the number of the contact members 104 and 105 employed. When properly adjusted, the slotted openings 82 in disc 78 correspond in direction to the diagonals of the antenna support 10 of receiving station A. Each of the receiving stations B, C and D are similarly connected to rotate the discs 81, 80 and 79 to cause the slots therein to extend in directions corresponding to the diagonals of the respective antenna supports. Thus, when signals are received from a signal source S by all of the receiving stations, the discs 78, 79, 80 and 81 are automatically adjusted so that one of the slots 82 in each disc points toward a position S' corresponding to scale to the position S. The point at which these slots intersect, therefore, indicates not only the direction of the source of signals but the actual position thereof.

It is to be noticed in Fig. 3 that there is no other point at which the slots 82 in the four discs intersect. This is generally true unless the receiving stations are so positioned that one station is at the apex of a right angle with respect to two of the others. However, with any arrangement of four stations, there are six pairs of isolated critical points at which two points of intersections will be produced. If signals are received from one of these points, a false indication is given in addition to the true indication. However, only a slight movement of the source of signals from the critical point is necessary to destroy entirely the false indication. Thus, if a ship or plane happens to pass through one of the critical points, the true indication is continuously shown while the false indication appears for only a brief space of time. In addition to this, the true and false indications are always a great distance apart so that, if the approximate position of the source of signals is known, no confusion results. By the use of a fifth station, the false indication is eliminated entirely. In navigation by sea, the receiving stations, which would ordinarily be on land, may be so arranged that the false indications fall upon land and not upon sea. Thus no confusion can result therefrom.

For making the indication easily readable, a lamp bulb 121 or other source of light is mounted above the discs 78, 79, 80 and 81. A parabolic reflector 122 is associated with said lamp and is adapted to direct a beam of light downward upon said discs. By means of this, a ray of light passes through the intersection of the slots 82 and is projected upon a map E' located therebeneath. The map E' corresponds in outline to the dotted lines E in Fig. 1. The position of the ray of light upon the map indicates accurately the location of the source of signals.

For making a permanent record of the path of a moving ship or airplane, the map E' is printed upon a plate, preferably of glass, and the said plate is then sensitized with a photographic solution which is not rapidly affected by ordinary light but which will be affected by the strong beam of light from the reflector 122. The said beam, in passing over the map, therefore, leaves a record which may be permanently preserved by developing the plate.

For informing the pilot of the ship or airplane of his position at all times, a radio-television transmitter 123 is placed beneath the plate E'. The said plate, whether sensitized or not, is made of transparent material so that the position of the beam of light thereon is visible from beneath. At any convenient position on the ship or airplane, there is mounted a radio-television receiver adapted to project an indication of the position of the beam of light upon a plate 124 upon which is printed a map of the territory covered by the particular stations involved. In Fig. 12 there is shown a portion of the instrument board of an airplane having various instruments 125 mounted thereon and having a ground glass plate 124 upon which a spot of light S″ is projected by a radio-television receiver located behind the instrument board. The position of the said spot of light indicates to the pilot his exact position at any given time. Since only the position of a single spot of light is to be transmitted, the simplest form of radio-television apparatus may be used.

The great advantages of this invention in air and sea navigation are obvious. By means thereof an airplane may be accurately guided to a landing field through a heavy fog, a plane forced down in wild country or at sea may be quickly found by the aid of the permanent record of the path of the plane preserved at the central station, an aviator approaching a mountain range may be made aware of the fact and may choose his altitude accordingly even though the mountains can not be seen, or a ship navigating by "dead reckoning" may be constantly informed of its true position and may be safely guided to its harbor. Another advantage resides in the fact that not only the pilot but the central station operator and anyone else equipped with suitable radio-television receiving apparatus is kept informed of the location of the ship or airplane.

Many variations in the details of the apparatus as described herein may be made without departing from the broader aspects thereof as defined by the following claims. For example, the discs 78, 79, 80 and 81 may be formed of transparent material, coated with an opaque substance except at the position corresponding to the slotted openings 82. The term "slotted openings" as used in the claims is intended to include such a variation.

The invention claimed is:

1. In combination with a plurality of radio receiving stations, spaced apart and each having directional receiving apparatus adapted to indicate the direction from which radio signals are received, a rotatable member for each of said stations, said members being arranged in parallel overlapping relation and rotatable about parallel axes arranged in positions corresponding in scale to the positions of the corresponding receiving stations and each of said members having a slotted opening therein passing through the rotational axis thereof, and means for adjusting the position of each of said members to bring said slotted openings into correspondence with the direction from which radio signals are received by its corresponding receiving station, whereby the intersection of the projections of said slotted openings indicates to scale the position of the source of said signals.

2. In combination with a plurality of radio receiving stations, spaced apart and each having directional receiving apparatus adapted to indicate the direction from which radio signals are received, a rotatable member for each of said stations, said members being arranged in parallel overlapping relation and rotatable about parallel axes arranged in positions corresponding in scale to the positions of the corresponding receiving stations and each of said members having a slotted opening therein passing through the rotational axis thereof, means for adjusting the position of each of said members to bring said slotted openings into correspondence with the direction from which radio signals are received by its corresponding receiving station, whereby the intersection of the projections of said slotted openings indicates to scale the position of the source of said signals, a source of light spaced from said rotatable members in the direction of their axes and projecting parallel rays upon said rotatable members, and a receiving member positioned upon the opposite side of said rotatable members to said source of light for receiving a ray of light through the intersection of said slotted openings for indicating the position of said signal source.

3. In combination with a plurality of radio receiving stations, spaced apart and each having directional receiving apparatus adapted to indicate the direction from which radio signals are received, a rotatable member for each of said stations, said members being arranged in parallel overlapping relation and rotatable about parallel axes arranged in positions corresponding in scale to the positions of the corresponding receiving stations and each of said members having a slotted opening therein passing through the rotational axis thereof, means for adjusting the position of each of said members to bring said slotted openings into correspondence with the direction from which radio signals are received by its corresponding receiving station, whereby the intersection of the projections of said slotted openings indicates to scale the position of the source of said signals, a source of light spaced from said rotatable members in the direction of their axes and projecting parallel rays upon said rotatable members, and a sensitized photographic plate positioned upon the opposite side of said rotatable members from said source of light for receiving a ray of light through the intersection of said slotted openings for making photographic record thereon indicating the position of said signal source.

4. In combination with a plurality of radio receiving stations, spaced apart and each having directional receiving apparatus adapted to indicate the direction from which radio signals are received, a rotatable member for each of said stations, said members being arranged in parallel overlapping relation and rotatable about parallel axes arranged in positions corresponding in scale to the positions of the corresponding receiving stations and each of said members having a slotted opening therein passing through the rotational axis thereof, means for adjusting the position of each of said members to bring said slotted openings into correspondence with the direction from which radio signals are received by its corresponding receiving station, whereby the intersection of the projections of said slotted openings indicates to scale the position of the source of said signals, a source of light spaced from said rotatable members in the direction of their axes and projecting parallel rays upon said rotatable members, a plate positioned upon the opposite side of said rotatable members for receiving a ray of light from said source of light through the intersection of said slotted openings for indicating the position of said signal source, and radio-television apparatus positioned to receive and transmit a visual image of said plate and the ray of light thereon.

5. The combination of a plurality of radio receiving stations spaced apart and each having directional receiving apparatus, means for adjusting the receiving apparatus of each of said stations to indicate the direction from which signals are being received thereby, transmitting means for conveying said indications from all of said stations to a convenient point, a rotatable member at that point for each of said stations, said members being arranged in parallel overlapping relation and rotatable about parallel axes arranged in positions corresponding in scale to the positions of the corresponding receiving stations, and each of said members having two slotted openings therein arranged at right angles to each other and intersecting each other at the axis of rotation, and means for rotating each of said rotatable members in response to the indication received from its corresponding station to bring said slotted openings into correspondence with the direction from which the signals are received by said stations, whereby the intersection of the projections of said slotted openings indicates to scale the position of the source of said signals.

6. The combination of a plurality of radio receiving stations spaced apart and each having directional receiving apparatus, means for adjusting the receiving apparatus of each of said stations to indicate the direction from which signals are being received thereby, transmitting means for conveying said indications from all of said stations to a convenient point, a rotatable member at that point for each of said stations, said members being arranged in parallel overlapping relation and rotatable about parallel axes arranged in positions corresponding in scale to the positions of the corresponding receiving stations and each of said members having two slotted openings therein arranged at right angles to each other and intersecting each other at the axis of rotation, means for rotating each of said rotatable members in response to the indication received from its corresponding station to bring said slotted openings into correspondence with the direction from which the signals are received by said stations whereby the intersection of the projections of said slotted openings indicates to scale the position of the source of said signals, a source of light spaced from said rotatable members in the direction of their axes and projecting parallel rays upon said rotatable members, and a receiving member positioned upon the opposite side of said rotatable members to said source of light for receiving a ray of light through the intersection of said slotted openings for indicating the position of said signal source.

7. The combination of a plurality of radio receiving stations spaced apart and each having directional receiving apparatus, means for adjusting the receiving apparatus of each of said stations to indicate the direction from which signals are being received thereby, transmitting means for conveying said indications from all of said stations to a convenient point, a rotatable member at that point for each of said stations, said members being arranged in parallel overlapping relation and rotatable about parallel axes arranged in positions corresponding in scale to the positions of the corresponding receiving stations and each of said members having two slotted openings therein arranged at right angles to each other and intersecting each other at the axis of rotation, means for rotating each of said rotatable members in response to the indication received from its corresponding station to bring said slotted openings into correspondence with the direction from which the signals are received by said stations, whereby the intersection of the projections of said slotted openings indicates to scale the position of the source of said signals, a source of light spaced from said rotatable members in the direction of their axes and projecting parallel rays upon said rotatable members, and a sensitized photographic plate positioned upon the opposite side of said rotatable members from said source of light for receiving a ray of light through the intersection of said slotted openings for making a photographic record thereon indicating the position of said signal source.

8. The combination of a plurality of radio receiving stations spaced apart and each having directional receiving apparatus, means for adjusting the receiving apparatus of each of said stations to indicate the direction from which signals are being received thereby, transmitting means for conveying said indications from all of said stations to a convenient point, a rotatable member at that point for each of said stations, said members being arranged in parallel overlapping relation and rotatable about parallel axes arranged in positions corresponding in scale to the positions of the corresponding receiving stations, and each of said members having two slotted openings therein arranged at right angles to each other and intersecting each other at the axis of rotation, means for rotating each of said rotatable members in response to the indication received from its corresponding station to bring said slotted openings into correspondence with the direction from which the signals are received by said stations, whereby the intersection of the projections of said slotted openings indicates to scale the position of the source of said signals, a source of light spaced from said rotatable member in the direction of their axes and projecting parallel rays upon said rotatable members, a plate positioned upon the opposite side of said rotatable members for receiving a ray of light from said source of light through the intersection of said slotted openings for indicating the position of said signal source, and radio-television apparatus positioned to receive and transmit a visual image of said plate and the ray of light my signature.

In witness whereof, I have hereunto affixed thereon.

OLIVER C. WARRICK.